Nov. 3, 1953

A. E. YOUNG 2,657,798

POTATO DIGGER HAVING MEANS FOR SEPARATING
VINES AND STONES FROM POTATOES

Filed Feb. 11, 1949

INVENTOR.
AUSTIN E. YOUNG

BY
*C. T. Parker & R. C. Johnson*

ATTORNEYS

INVENTOR.
AUSTIN E. YOUNG

Nov. 3, 1953  A. E. YOUNG  2,657,798
POTATO DIGGER HAVING MEANS FOR SEPARATING
VINES AND STONES FROM POTATOES
Filed Feb. 11, 1949  3 Sheets-Sheet 3

INVENTOR.
AUSTIN E. YOUNG
BY
ATTORNEYS

Patented Nov. 3, 1953

2,657,798

UNITED STATES PATENT OFFICE 2,657,798

POTATO DIGGER HAVING MEANS FOR SEPARATING VINES AND STONES FROM POTATOES

Austin E. Young, Onondaga, N. Y., assignor, by mesne assignments, to Deere & Company, Moline, Ill., a corporation of Illinois Application February 11, 1949, Serial No. 75,809

7 Claims. (Cl. 209—72)

The present invention relates generally to agricultural implements and more particularly to harvesters for root crops and the like, such as potato diggers.

The object and general nature of the present invention is the provision of a machine for harvesting potatoes which is so constructed and arranged as to handle the potatoes in a gentle manner, so as not to bruise them, and in which means is provided for removing vines, trash and the like.

It is a further feature of this invention to provide new and improved means for separating the potatoes from stones whereby few, if any, stones pass with the potatoes to the sacking or crating station on the harvester.

Still further, another feature of this invention is the provision of vine-removing means in the form of a combined cutter and blower which shreds or comminutes the vines, trash and the like and blows the same back onto the field in a fine or disintegrated form so as to facilitate the return of the vines, trash and the like to the ground as humus or mulch.

These and other objects and advantages of the present invention will be apparent to those skilled in the art after a consideration of the following detailed description, taken in conjunction with the accompanying drawings, in which.

Figure 1:
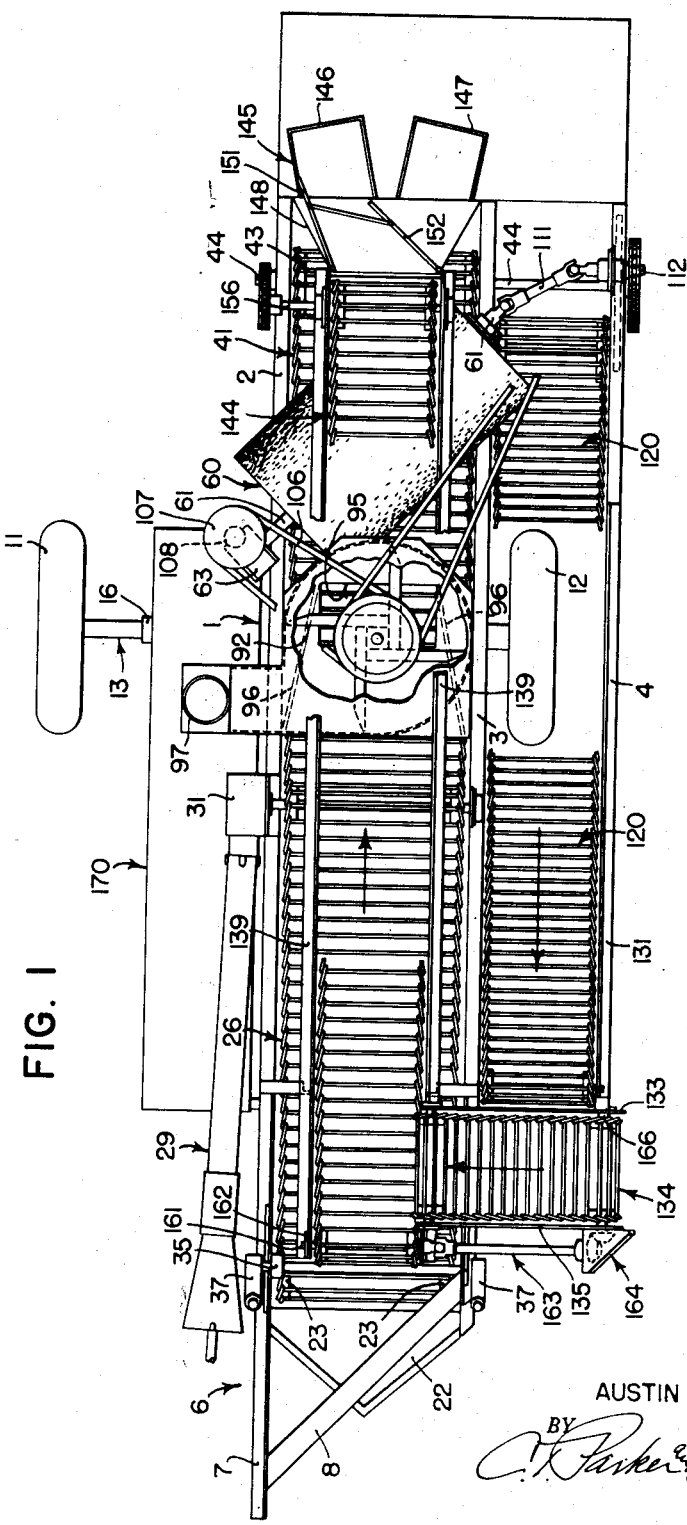
Figure 1 is a plan view of a potato harvester in which the principles of the present invention have been incorporated.
Figure 2:
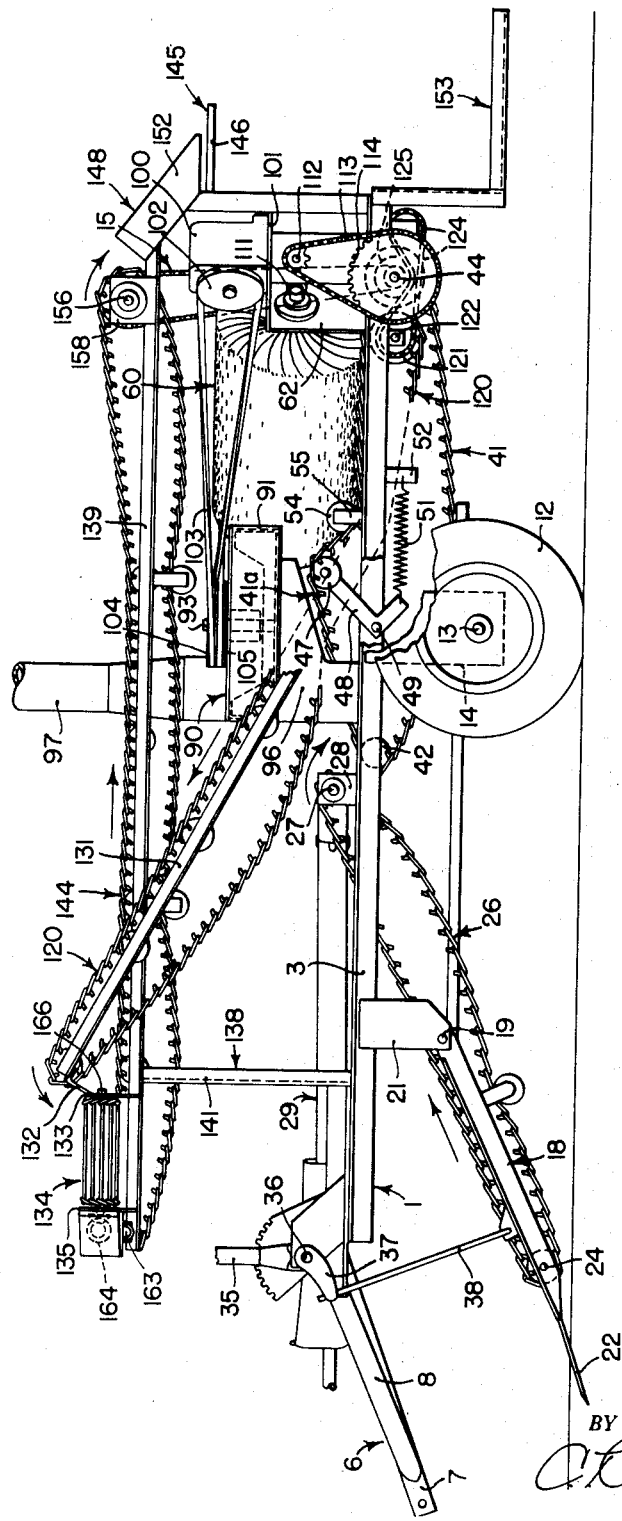
Figure 2 is a side view of the machine shown in Figure 1.

Referring first to Figures 1 and 2, the frame of the harvester is indicated in its entirety by the reference numeral 1 and comprises a plurality of generally longitudinally extending frame bars 2, 3 and 4 interconnected to cross bars, not shown but which may be of any suitable construction. Secured to the front of the frame 1 is a hitch frame structure indicated in its entirety by the reference numeral 6 (Figure 1), and which includes a forwardly and downwardly extending bar 7 and a diagonally disposed bar 8 interconnected at their forward ends and adapted to be supportingly connected with a propelling tractor or the like. The frame 1 and component parts of the harvester are supported in the main on a pair of ground wheels 11 and 12, mounted on a through axle 13 and connected to the frame through vertical brackets 14. The brackets 14 may be vertically adjustable, as may be necessary to adjust the height of the frame and associated parts, and the axle 13 may be made up of telescopically associated parts, as indicated at 16, so as to provide for adjusting the lateral distance between the ground wheels 11 and 12.

A shovel frame 18 (Figure 2) is pivotally connected with the frame bars 2 and 3, as by a pivot shaft 19 carried in a pair of depending brackets 21 fixed at their upper ends to the forward portions of the frame bars 2 and 3. The shovel frame 18 extends downwardly and forwardly from the pivot axis 19 and at its lower end carries a digging shovel 22 of more or less conventional construction. The shovel frame 18 also includes suitable rollers, two of which are shown at 23 (Figure 1), carried by stub shafts 24 (Figure 2), on which a conveyor of conventional potato chain construction is carried. The conveyor, which is indicated in its entirety by the reference numeral 26, comprises an endless chain which extends rearwardly beyond the shovel frame 18 and at its rear end is supported on suitable sprockets fixed to a transverse drive shaft 27 (Figure 2) which is journaled for rotation in bearing brackets 28 and is driven by a power take-off shaft unit 29 which receives power from the tractor and delivers the same to the transverse drive shaft 27 through a bevel gear set 31. The front end of the shovel frame 18 is raised and lowered by means of a hand lever 35 mounted on the front portion of the frame 1 and connected to opposite sides of the frame 18 through a cross shaft 36, a pair of arms 37 and a pair of raising links 38.

Referring now to Figure 2, disposed in line with but longitudinally in rear of the first conveyor chain 26 is a second conveyor 41 in the form of a generally horizontally disposed potato chain which is mounted on suitable rollers 42 at its forward end and at its rear end is mounted on drive sprockets 43 which are fixed to a cross shaft 44, as best shown in Figure 1. From Figure 2 it will be noted that the upper run of the conveyor chain 41 is disposed with its forward portion underneath the delivery end of the first or front conveyor chain 26 and, further, that the upper run of the chain 41 is carried partially on a pair of rollers 47, each of which is mounted on a bell crank 48 pivoted, as at 49, to the associated frame bar, 2 or 3, the roller supporting portions of the bell cranks being held in an upper position by means of springs 51 connected at their forward ends, respectively, to the lower arms of the bell cranks 48 and at their rear ends to brackets 52 fixed to the frame 1. By virtue of this construction the forward portion of the upper run of the second conveyor chain lies in an upwardly and rearwardly extending plane, as will be referred to in detail later. Rearwardly of the spring-biased bell cranks 48, the upper run of the chain 41 passes underneath a pair of idler rollers 54 mounted for rotation on brackets 55 carried by the frame bars 2 and 3.

Figure 3:
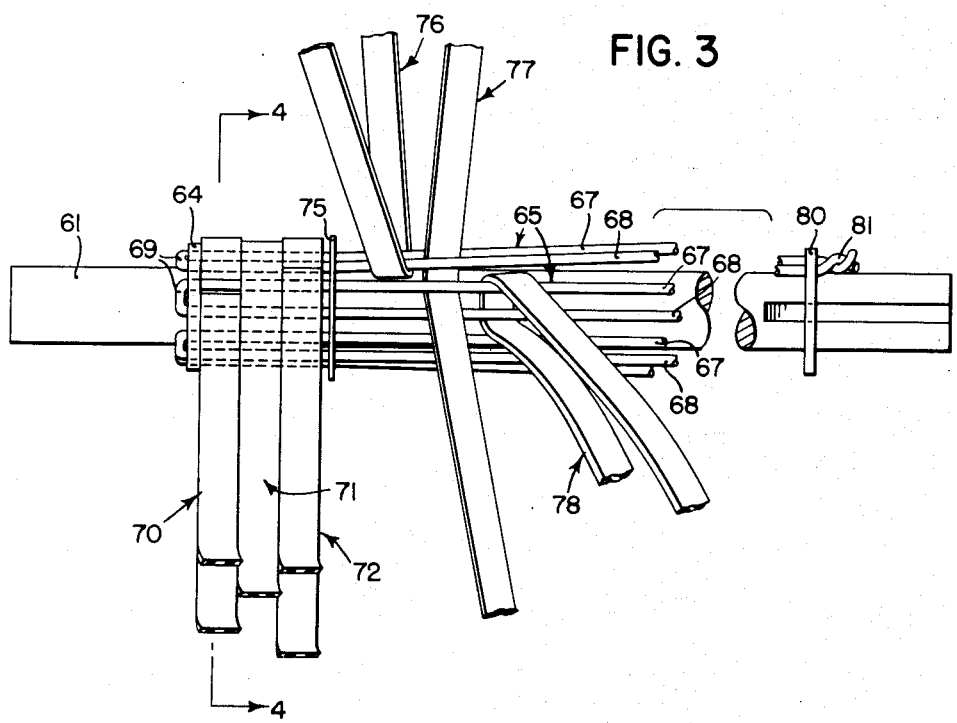
Figure 3 is an enlarged fragmentary view of the rotor which separates the potatoes from the stones during the operation of the machine.
Figure 4:
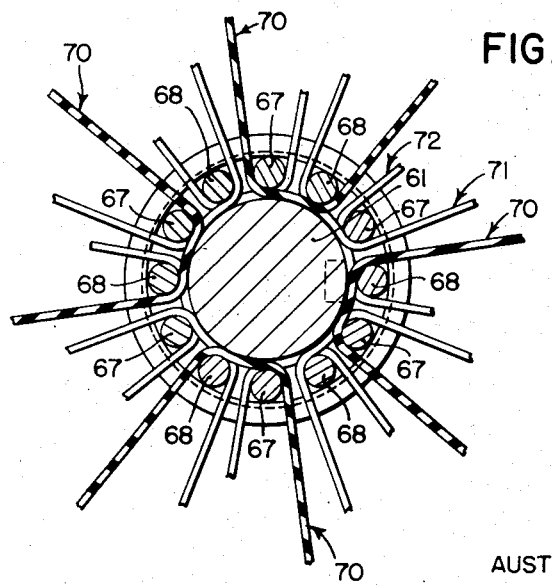
Figure 4 is a sectional view taken generally along the line 4—4 of Figure 3 but showing the rotor strips extending radially outwardly in the positions they occupy when they are extended by centrifugal force during the rotation of the rotor.

Operating over the horizontal portion of the upper run of the chain 41, rearwardly of the bell cranks 48, is a potato-removing rotor which is indicated in its entirety by the reference numeral 60. The rotor 60 is mounted for rotation about an axis which is disposed in a diagonal position relative to the upper run of the conveyor 41, and the axis lying in a horizontal plane. This rotor 60 comprises a shaft 61 which is supported for rotation in a rear bracket 62 and at its forward end in a gear case 63 which is fixed to the frame bar 2 and serves as a bracket support for the shaft 61 at the forward end of the latter. In addition to the shaft 61, the rotor 60 includes a plurality of flexible strands which preferably are in the form of strips of rubber or rubber-like material, and the arrangement and construction of the rotor 60, which is best shown in Figures 3 and 4, will now be described. Fixed rigidly, as by welding, to the forward end portion of the shaft 61 is a collar 64 which is provided with a plurality of apertures adapted to receive a plurality of rod members 65. Each of the members 65 is U-shaped in configuration, having parallel elongated rod sections 67 and 68 and an interconnecting section 69 which lies adjacent the collar or flange 64, as best shown in Figure 3. In one proposed form of construction there are six U-shaped rod members 65 which provide twelve rod sections 67 and 68. The rod members 65 are arranged somewhat as a cage about the shaft 61 and the rod sections 66 and 67 lie fairly close to the periphery of the shaft 61, as best shown in Figure 4.

The rubber strips, which form the outer elements of the rotor 60, are arranged and assembled as is best illustrated in Figures 3 and 4. Each of the rubber strips in the first section of the rotor going from left to right, Figure 3, is indicated by the reference numeral 70, and in assembling the strips 70, each strip is passed under two rod sections and brought out so that the ends of each strip are of substantially the same radial length. Skipping one rod section, the next strip is inserted underneath the next two rod sections and the end portions equalized, and the other two strips are likewise mounted in position, skipping one rod section and then inserting each strip under the next two rod sections. The next series of strips 71 are assembled in like manner, except that, as best shown in Figure 4, the strips 71 are passed under two rod sections only one of which is embraced by the first series of strips 70. That is to say, each strip 71 is passed under one of the rod sections under which the strips 70 are passed and under the rod section which is skipped by the strips 70. The third series of strips 72 is assembled in a similar way except that each of the third strips 72 is passed under the other of the rod sections embraced by the strips 70 and the rod section skipped by the strips 70 but embraced by the strips 71.

After a plurality of strips 70, 71 and 72 are threaded under the rod sections as just described, a ring or washer 75 is forced over the rod sections 67, 68, the diameter of the opening of the washer or ring 75 being such that the rods are forced down toward the periphery of the shaft 61, thereby firmly holding the looped portions of the strips 70, 71 and 72 where they pass underneath the rod sections. Next the assembly of the rubber strips is continued, in substantially the same way as just described, Figure 3 showing a rubber strip of the next series, indicated by the reference numeral 76, being threaded underneath two rod sections 67 and 68 and one of the strips of the series 77 being shown as threaded underneath the rod sections 68 of the pair just mentioned and the rod section 67 of the next adjacent rod member 65. Next, one of the strips of the series 78 is shown in Figure 3 as being passed under the rod sections 67 and 68 of the next rod member 65. It will be understood, however, that in the completed roller, there will be four rubber strips in each series, that is, there will be four rubber strips in each radial plane, this being the construction illustrated in Figure 4. After the next three series of rubber strips 76, 77 and 78 are assembled on the rod members 65, another confining ring or washer 75 is forced over the rods for holding the strips in position and preventing their becoming displaced in operation. After all of the strips have been assembled to form the complete rotor, a terminal washer or flange member 80, apertured to correspond to the flange 64 in order to receive the end portions of the rod members 67 and 68, is passed over the shaft 61 (the right end as viewed in Figure 3), and then the ends of the rod sections 67, 68 are clinched or twisted in pairs, as indicated at 81 in Figure 3, so as to hold the rod sections in position. The apertured end washer or ring 80 is preferably keyed to the shaft 61 so that when the shaft 61 is driven, the drive is transmitted directly to the rod members 65.

A vine-remover unit, indicated in its entirety by the reference numeral 90, is mounted on the frame bars 2 and 3 substantially directly above the forward inclined portion 41a of the conveyor chain 41, the inclined portion being maintained yieldably in that position by the spring-biased bell cranks 48. The vine-removing unit comprises a blower housing 91 in which a bladed fan 92 is mounted for rotation about a vertical axis, the fan being mounted on a shaft 93, the upper portion of which is supported by suitable bearing means carried by the housing 91. The blades of the fan 92 also serve as vine and trash cutting means for shredding or comminuting the vines, trash and the like drawn into the housing 91 by the suction created by the fan 92 when the latter is rotated, the vines, trash and the like entering the housing 91 through a throat or entrance 95 (Figure 1). The throat or entrance 95 lies above the inclined portion 41a of the conveyor 40 and the housing 91 includes side sections or deflectors 96 (Figure 2) which are angled so as to conform to the normal position of the conveyor section 41a, the side sections 96 serving to guide vines, trash and the like toward the throat 95 whereby the suction created by the rotation of the fan 92 is sufficient to draw off the vines, trash and the like from the potatoes as the harvested material is carried along from front to rear by the movement of the chain 41. The shredded material is discharged outwardly of the fan housing 91 through a discharge conduit 97 and preferably is directed back onto the ground thereby.

The vine-removing and disentegrating fan 90 is driven by means of a source of power, such as a separate engine 100 mounted in any suitable way on the frame 1, as by an extension 101 of the rearward supporting bracket 62. The crankshaft of the engine 100 carries a sheave 102 over which a belt 103 is trained, the belt serving to drive a pulley 104 fixed to the upper end of the fan shaft 93. Suitable control means (not shown) may be provided for varying the speed of the engine 100, interrupting the transmission of power to the fan shaft, as desired. A second pulley 105 on the fan shaft receives a belt 106 which, as best shown in Figure 1, drives the pulley 107 that is fixed to the upper end of a shaft 108 that forms a part of the gear unit 63. The latter unit includes worm and gear reduction means which is connected to drive the shaft 61 of the potato separating unit 60. The parts are arranged so as to rotate the rotor 60 at the proper speed, which may be in the neighborhood of 200 to 300 revolutions per minute, depending upon the diameter of the unit when in operation, the weight of the rubber strips and the rate of movement of the conveyor bringing the material to the rotor.

The rear end of the rotor shaft 61 is connected through a universal joint assembly 111 to drive a cross shaft 112. The latter shaft carries a sprocket which is connected by a chain 113 to a larger sprocket 114 which is fixed to left end of the cross shaft 44, the right end of which, as described above, carries sprockets 43 driving the conveyor chain 41.

The upper runs or flights of both of the conveyor chains 26 and 41, described above, move rearwardly. A third conveyor, indicated in its entirety by the reference numeral 120, is mounted on the frame 1, preferably between the frame bars 3 and 4, as best shown in Figure 1, and is driven, as will be described below, so as to carry the upper run or flight of the conveyor 120 forwardly. The conveyor 120 operates closely alongside the upper flight of the conveyor 41, particularly the horizontal portion thereof which lies underneath the rotor 60. The rear portion of the conveyor 120 passes over driving sprockets 121 which are mounted on a rear cross shaft 122. The latter shaft is driven by a drive chain 124 which, as best shown in Figure 2, has an upper portion engaging the under side of a drive sprocket 125 mounted on the left end of the shaft 44, just inside the large sprocket 114, the chain 124 passing over a pair of sprockets, the forward of which is fixed to the shaft 122 in order to drive the same.

As best shown in Figure 2, the forward portion of the conveyor 120 is carried in upwardly and forwardly angled positions, being supported in this position by conveyor frame angles 131, the forward ends of which are supported by brackets 132 on the rear side member 133 of a front cross conveyor, indicated in its entirety by the reference numeral 134. The front side member of the cross conveyor is indicated by the reference numeral 135 and is supported, together with associated parts, on a framework 138 which includes horizontal bars 139 and vertical bars 141, as best shown in Figure 2. The upper run of the cross conveyor 134 moves from left to right, as indicated by the arrow in the left hand portion of Figure 1, and discharges potatoes delivered to the conveyor 134 by the conveyor 120 onto a rearwardly moving sorting conveyor 144 which extends the full length of the machine and at its rear end delivers the potatoes to a bagging station 145. The latter includes two bag-receiving supports 146 and 147, and a chute 148 which is provided with a pair of interconnected deflectors 151 and 152 pivoted at their forward ends to the chute 148 so as to deflect potatoes from the rear end of the sorting conveyor 144 to one or the other of the bags mounted on the bag supports 146 and 147. The rear end of the frame 1 is provided with a platform 153 upon which the operator stands and upon which the bags are carried until the machine reaches the point at which it is desired to deposit the bags on the ground.

The rear end of the sorting conveyor 144 is supported on driving sprockets which are fixed to an upper transverse drive shaft 156 which is driven by a chain and sprocket connection 157 from the right end of the transverse shaft 44 mentioned above. The upper cross shaft 156 is supported on the upper frame bars 139 by bearing brackets 158. The forward end of the sorting conveyor 144 is supported on sprockets carried by a front upper cross shaft 161 mounted in suitable bearing brackets 162 fixed to the upper frame angles 139. The left end of the front cross shaft 161 is connected by a universal joint and telescopic shaft assembly 163 to a bevel gear set 164 which drives a conveyor shaft 166 carrying drive sprockets over which the left end of the cross conveyor 134 is received.

In operation, the shovel 22 is lowered until the crop, adhering soil, vines, trash and the like pass over onto the first conveyor 26. Material is delivered from the rear end of the latter conveyor onto the inclined portion 41a of the second conveyor 41. At this point vines, trash, and other like material are drawn upwardly into the blower fan 92 and disintegrated by the latter and discharged outwardly to the conduit 97. Any further objects, such as stones or the like, continue on the upper run of the conveyor 41 and move onto the rear horizontal portion thereof. If such objects are of excessive size, the bell cranks 48 yield downwardly to permit the passage of such objects over onto the rear of the horizontal portion of the conveyor 41. At this point the potatoes, together with any stones and the like, pass under the rotor 60. This unit is driven at sufficient speed to cause the rubber strips to extend outwardly, as illustrated in Figure 2, whereby the unit 60 acts somewhat as a rotary brush and the potatoes are swept off the rear portion of the conveyor 41 over onto the forwardly moving third conveyor 120. The rotor 60 is driven at such speed that the flexible elements strike the potatoes with sufficient force to move them from the conveyor 41 onto the conveyor 120, but with insufficient force to move heavy objects such as stones and the like. The stones continue to move rearwardly with the upper run of the conveyor 41 and drop from the machine over the rear end of the latter, just forward of the bagger's platform 153.

The potatoes which are swept forwardly diagonally away from the conveyor 41 onto the conveyor 120 then move forwardly with the latter and upwardly at the forward end where they are dropped off onto the cross conveyor 134. From the latter conveyor the potatoes are delivered onto the forward end of the rearwardly moving sorting conveyor 144 from whence the potatoes are delivered by the deflector plates 151 and 152 into one or the other bags or other containers arranged to receive them. A platform 170 is provided on the right side of the machine to support operators for removing any material which is not removed either by the fan 92 or the stone-separating rotor 60.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. For use in a potato harvester or the like, means for separating potatoes from stones or other heavy objects, comprising a shaft carrying a peripheral series of axially extending rod members, each comprising a pair of parallel rod sections and an interconnecting section, an apertured flange fixed to said shaft, said rod members lying in the apertures of said flange, a plurality of sets of flexible U-shaped flail elements looped progressively underneath said rod sections, each flail element being looped under two adjacently disposed rod sections and said flail elements being arranged in staggered relation with each flail element being spaced circumferentially from the adjacent element by a distance equal to the distance between adjacent rod sections, a confining ring surrounding said rod sections between adjacent sets of flail elements and acting to hold the latter clamped to the shaft, and an apertured ring receiving the ends of said rod sections and fixed to rotate with the shaft.

2. A device for separating potatoes from stones and the like, comprising a pair of adjacently mounted, generally horizontal conveyors, each having a transverse series of spaced bars forming unobstructed transverse spaces between the bars, one of said conveyors being adapted to carry potatoes and stones intermixed thereon generally in a single heterogeneous layer lying on the upper surface of the conveyor, a rotor mounted above said one conveyor for movement about a generally horizontal axis arranged to form an acute angle with the direction of travel of the conveyor, said rotor having flexible elements to engage both potatoes and stones in said layer, and means for rotating said rotor in a direction generally opposite to the movement of said one conveyor and at a speed that is insufficient to cause said elements to move the stones off the conveyor but which speed is sufficient to move the potatoes over onto the adjacent conveyor, the stones remaining on the conveyor and passing over the discharge end of said first conveyor.

3. In a potato digger including a conveyor movable generally horizontally, the improvement comprising a vine-removing suction device adapted to be disposed above said conveyor for drawing vines, trash and the like upwardly from the potatoes on the conveyor, one or more deflectors depending from the suction device and having their lower edges closely adjacent the upper side of the conveyor, said deflectors serving as means for guiding vines, trash and the like on said conveyor toward said suction device, and yieldable resilient means adapted to be disposed underneath said conveyor and acting upwardly against the underside of the potato-carrying portion thereof for holding the latter thereof in operative relation with respect to said deflector or deflectors, said resilient means yielding to permit said portion of the conveyor to move downwardly in the event a large stone or other obstruction is carried toward the deflector or deflectors by said conveyor.

4. In a potato digger including a conveyor movable generally horizontally, the improvement comprising a vine-removing suction device adapted to be disposed above said conveyor, said suction device having side sections, the lower edges of which are adapted to be disposed relatively closely adjacent the upper side of the conveyor whereby the suction device serves to draw vines, trash and the like upwardly from the potatoes on the conveyor, means for supporting the portion of said conveyor passing under said side sections for up and down movement toward and away from said suction device, including conveyor-supporting rollers and spring biased means acting upwardly through said rollers to yieldably hold said conveyor portion up into position relative to said suction device, and means for driving said suction device.

5. In a potato digger including a conveyor movable generally horizontally, the improvement comprising a pair of fore and aft spaced pairs of sprockets for supporting said conveyor, a pair of spring mounted arms and conveyor-engaging rollers adapted to support an intermediate portion of said conveyor in an upwardly angled position, a vine-removing suction device adapted to be disposed above said angled conveyor portion and having rearwardly converging deflectors connected with said suction device and having their lower edges disposed adjacent said angled conveyor portion for deflecting vines, and trash and the like toward said suction device, idler roller means adapted to engage the upper portion of said conveyor for disposing a rear conveyor portion in a generally horizontal position.

6. A device for separating stones from potatoes comprising a conveyor having a transverse series of spaced bars traveling in a substantially horizontal path and forming unobstructed transverse spaces between the bars, a rotary shaft mounted above the conveyor on a horizontal axis and arranged to form an acute angle with the direction of travel of the conveyor, flexible members mounted on the shaft and extending proximate to the conveyor, means for rotating the shaft to rotate the members in a direction opposite to the movement of the conveyor so as to engage all of the articles on the conveyor and to move the potatoes, having less density than stones, transversely of the conveyor, and means for separately receiving the potatoes moved transversely of the conveyor.

7. A device for separating stones from potatoes comprising a conveyor having a transverse series of spaced bars traveling in a substantially horizontal path and forming unobstructed transverse spaces between the bars, a rotary shaft mounted above the conveyor on a horizontal axis and arranged to form an acute angle with the direction of travel of the conveyor, flexible members mounted on the shaft and extending proximate to the conveyor, each of said elements comprising a normally limp strip of rubber-like material, means for rotating said shaft at a speed sufficient to cause said strips to extend generally radially and to strike the potatoes with sufficient force to move them off said conveyor but with insufficient speed to remove stones or other heavy objects and in a direction opposite to the movement of the conveyor so as to engage all of the articles on the conveyor and to move the potatoes, having less density than stones, transversely of the conveyor, and means for separately receiving the potatoes moved transversely of the conveyor.

AUSTIN E. YOUNG.

References Cited in the file of this patent

UNITED STATES PATENTS

| Number | Name | Date |
|---|---|---|
| 399,025 | Evans | Mar. 5, 1889 |
| 539,027 | Bentley | May 14, 1895 |
| 584,889 | Packer | June 22, 1897 |
| 822,187 | Conover | May 29, 1906 |
| 891,299 | Smith et al. | June 23, 1908 |
| 984,487 | Parks et al. | Feb. 14, 1911 |
| 1,190,950 | Piepgras et al. | July 11, 1916 |
| 1,585,601 | Rabe et al. | May 18, 1926 |
| 1,615,134 | Price | Jan. 18, 1927 |
| 2,102,178 | Gerhardt | Dec. 14, 1937 |
| 2,102,758 | Spayd | Dec. 21, 1937 |
| 2,114,263 | Heaslet | Apr. 12, 1938 |
| 2,215,516 | Schooler | Sept. 24, 1940 |
| 2,277,450 | Parr | Mar. 24, 1942 |
| 2,365,077 | Hertzler et al. | Dec. 12, 1944 |
| 2,381,172 | Lundberg | Aug. 7, 1945 |
| 2,458,224 | Thompson | Jan. 4, 1949 |
| 2,468,639 | Sample | Apr. 26, 1949 |
| 2,529,620 | Marnach et al. | Nov. 14, 1950 |

FOREIGN PATENTS

| Number | Country | Date |
|---|---|---|
| 276,311 | Italy | July 19, 1930 |
| 325,106 | Germany | Sept. 9, 1920 |